(12) United States Patent
Shiozaki

(10) Patent No.: US 11,573,746 B2
(45) Date of Patent: Feb. 7, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Ichiro Shiozaki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 231 days.

(21) Appl. No.: 16/529,806

(22) Filed: Aug. 2, 2019

(65) Prior Publication Data

US 2020/0050406 A1 Feb. 13, 2020

(30) Foreign Application Priority Data

Aug. 13, 2018 (JP) .............................. JP2018-152221

(51) Int. Cl.
*G06F 3/12* (2006.01)
*H04N 1/00* (2006.01)

(52) U.S. Cl.
CPC .......... *G06F 3/1205* (2013.01); *G06F 3/1204* (2013.01); *G06F 3/1253* (2013.01); *H04N 1/00411* (2013.01)

(58) Field of Classification Search
CPC combination set(s) only.
See application file for complete search history.

(56) References Cited

U.S. PATENT DOCUMENTS

| 10,652,410 B2 | 5/2020 | Hamada | |
|---|---|---|---|
| 2009/0046318 A1* | 2/2009 | Sakikawa | G06F 3/1255 358/1.15 |
| 2012/0144329 A1* | 6/2012 | Sasaki | G06F 3/1204 715/764 |
| 2014/0247465 A1* | 9/2014 | Tsujimoto | H04N 1/00244 358/1.15 |
| 2018/0103163 A1 | 4/2018 | Shiozaki et al. | |
| 2018/0373481 A1* | 12/2018 | Kobayashi | H04N 1/00411 |
| 2019/0132476 A1* | 5/2019 | Sawano | H04M 3/5183 |
| 2019/0306349 A1* | 10/2019 | Shino | H04N 1/00517 |
| 2020/0050406 A1* | 2/2020 | Shiozaki | G06F 3/1253 |

FOREIGN PATENT DOCUMENTS

| JP | 2005031500 | 2/2005 |
|---|---|---|
| JP | 2005242827 | 9/2005 |
| JP | 2018063507 | 4/2018 |
| JP | 2018120473 | 8/2018 |

OTHER PUBLICATIONS

Office Action of Japan Counterpart Application, with English translation thereof, dated Apr. 19, 2022, pp. 1-6.

* cited by examiner

*Primary Examiner* — Helen Zong
(74) *Attorney, Agent, or Firm* — JCIPRNET

(57) ABSTRACT

An information processing apparatus includes a control unit that emphasizes, in a screen area for a related application program generated from a standard application program, a setting that has been extracted from plural settings to be displayed for the standard application program and whose setting value has been changed from a predetermined state.

14 Claims, 23 Drawing Sheets

FIG. 5A

| ABC | COPY | START |
|---|---|---|

| | 1 | 2 | 3 |
|---|---|---|---|
| 1 | 4 | 5 | 6 |
| | 7 | 8 | 9 |
| | | 0 | × |

| OUTPUT COLOR | AUTOMATIC |
|---|---|
| DUPLEX | ONE SIDE→ONE SIDE |
| PAPER FEED TRAY | AUTOMATIC |
| COLLATE | ✓ ▥ |
| STAPLE | NO |
| SIZE | 100% |
| DOCUMENT TYPE | TEXT AND IMAGES |
| XXX | — |
| XXX | — |
| XXX | — |

| REGISTER | RESET |
|---|---|
| | CUSTOMIZE |

FIG. 5B

| ABC | COPY | START |
|---|---|---|

| | 1 | 2 | 3 |
|---|---|---|---|
| 1 | 4 | 5 | 6 |
| | 7 | 8 | 9 |
| | | 0 | × |

| OUTPUT COLOR | AUTOMATIC |
|---|---|
| DUPLEX | ONE SIDE→ONE SIDE |
| PAPER FEED TRAY | AUTOMATIC |
| STAPLE | NO |
| SIZE | 100% |
| DOCUMENT TYPE | TEXT AND IMAGES |
| XXX | — |
| XXX | — |
| XXX | — |
| XXX | — |
| XXX | — |
| XXX | — |
| XXX | — |
| XXX | — |
| XXX | — |

| REGISTER | RESET |
|---|---|
| | CUSTOMIZE |

FIG. 5C

| × | CUSTOMIZATION FUNCTION | ✓ OK |
|---|---|---|
| OUTPUT COLOR | | ● |
| DUPLEX | | ● |
| PAPER FEED TRAY | | ● |
| COLLATE | | ⊘ |
| STAPLE | | ● |
| SIZE | | ● |

FIG. 9A

| LOGIN | COPY | | START |
|---|---|---|---|
| OUTPUT COLOR | | | AUTOMATIC |
| DUPLEX | | | DUPLEX → ONE SIDE |
| PAPER FEED TRAY | | | A4 TRAY 3 |
| STAPLE | | | NO |
| SIZE | | | AUTOMATIC |

[ONE-TOUCH APPLICATION COPY]

| LOGIN | ONE-TOUCH APPLICATION COPY | | START |
|---|---|---|---|
| SET DOCUMENT AND PRESS START BUTTON. | | | |
| NUMBER OF COPIES 1-999 | | 1 | − + |
| OUTPUT COLOR | | | AUTOMATIC |
| DUPLEX | | | DUPLEX → ONE SIDE |
| PAPER FEED TRAY | | | A4 TRAY 3 |
| COLLATE | | | ✓ ||| |
| STAPLE | | | NO |
| SIZE | | | AUTOMATIC |
| DOCUMENT TYPE | | | TEXT AND IMAGES |
| XXX | | | — |
| XXX | | | — |
| XXX | | | — |
| XXX | | | — |
| XXX | | | — |
| XXX | | | — |
| XXX | | | — |
| XXX | | | — |
| XXX | | | — |
| XXX | | | — |
| RESET | | | REMOVE ONE-TOUCH |

| LOGIN | ONE-TOUCH APPLICATION COPY | START |

SET DOCUMENT AND PRESS START BUTTON

NUMBER OF COPIES 1-999 | 1 | − | + |

| DUPLEX | DUPLEX→ONE SIDE |
|---|---|
| PAPER FEED TRAY | A4 TRAY 3 |
| SIZE | AUTOMATIC |
| OUTPUT COLOR | AUTOMATIC |
| COLLATE | ✓ ⦀ |
| STAPLE | NO |
| DOCUMENT TYPE | TEXT AND IMAGES |
| XXX | — |
| XXX | — |
| XXX | — |
| XXX | — |
| XXX | — |
| XXX | — |
| XXX | — |
| XXX | — |
| XXX | — |
| XXX | — |
| XXX | — |
| XXX | — |
| XXX | — |
| XXX | — |
| XXX | — |

| RESET | REMOVE ONE-TOUCH |

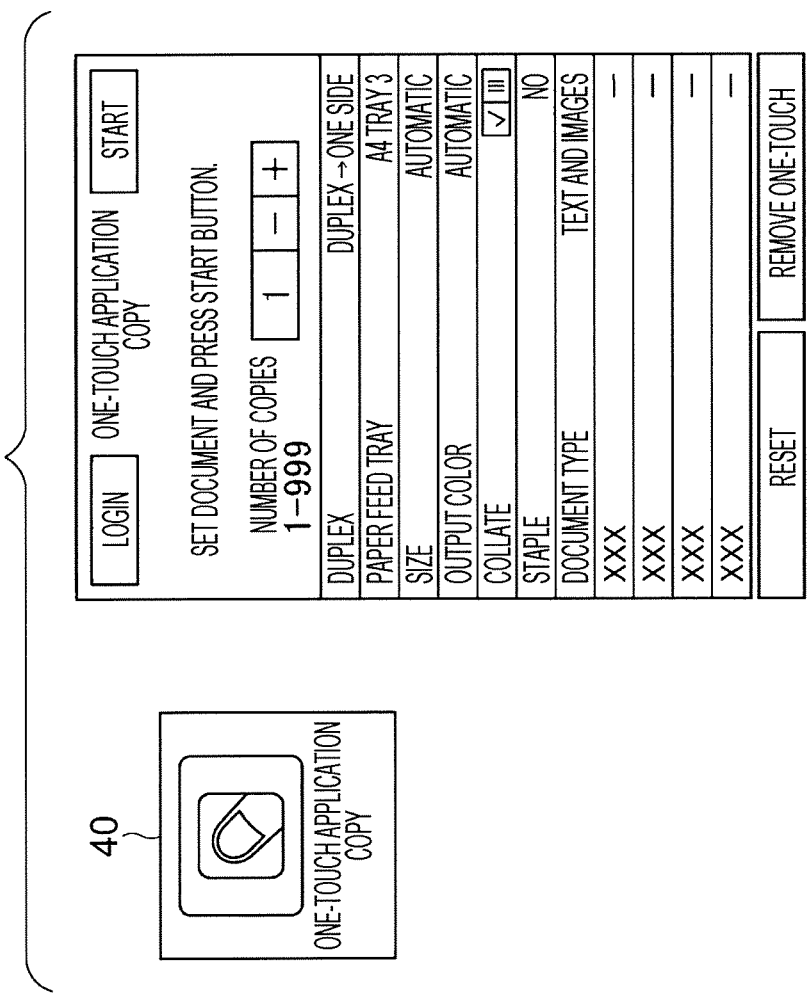

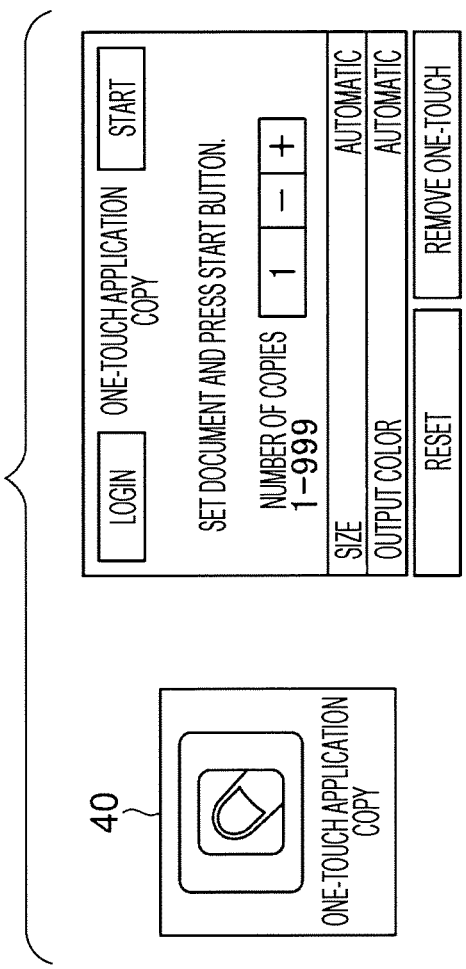

FIG. 17
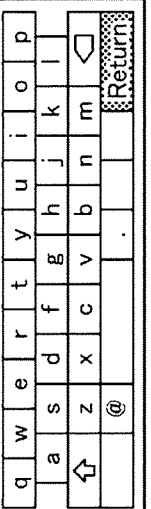
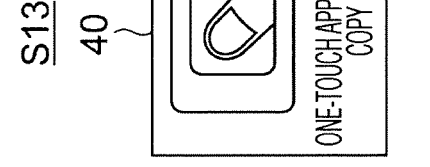

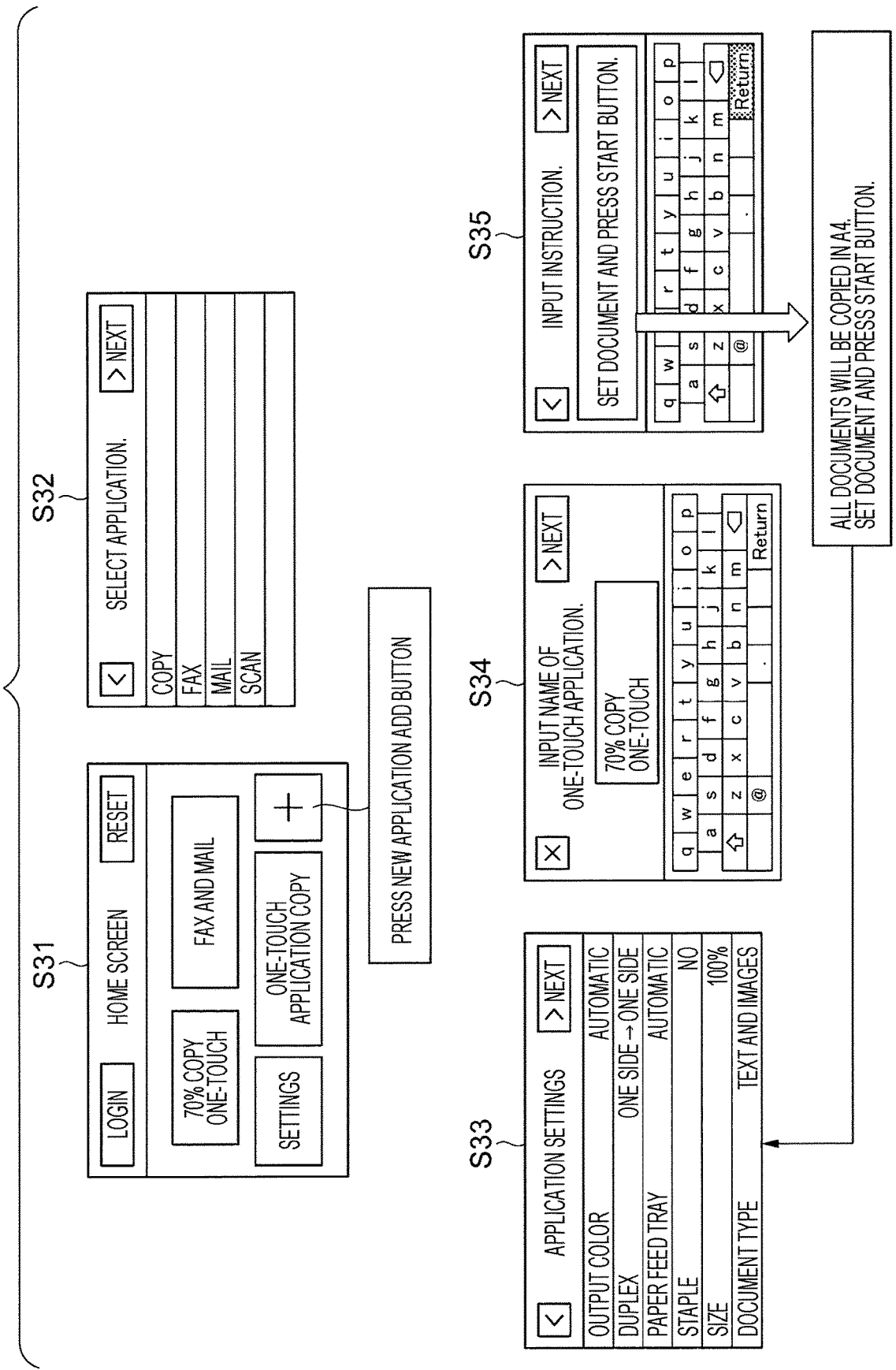

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-152221 filed Aug. 13, 2018.

BACKGROUND

(i) Technical Field

The present disclosure relates to an information processing apparatus and a non-transitory computer readable medium.

(ii) Related Art

Japanese Unexamined Patent Application Publication No. 2018-63507, for example, discloses an information processing apparatus capable of enabling a user to intuitively understand a function of an icon relating to a basic icon for performing a basic function of the information processing apparatus when the icon is generated from the basic icon. The information processing apparatus includes a basic operator for selecting execution of a certain function, a display unit that displays a screen including an operator related to the basic operator, and a generation unit that generates a new related operator by selecting the basic operator while using attribute information regarding the selected basic operator.

SUMMARY

An image forming apparatus, which is an example of an information processing apparatus, includes standard application programs for performing basic functions such as copy, mail, fax, and scan. Such an image forming apparatus might include related application programs generated by customizing the standard application programs.

A setting value of at least one of a plurality of settings of a related application program has been changed from a setting value for a standard application program. In a screen area for displaying the plurality of settings of the related application program, all of a plurality of settings of the standard application program might be displayed. In this case, it is difficult for a user to notice a change from the standard application program among the plurality of settings displayed in the screen area for the related application program. As a result, it is difficult for the user to understand a feature of the related application program.

Aspects of non-limiting embodiments of the present disclosure relate to an information processing apparatus and a non-transitory computer readable medium capable of enabling a user to recognize a setting of a related application program whose setting value has been changed from a setting value for a standard application program, the related application program being generated from the standard application program.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a control unit that emphasizes, in a screen area for a related application program generated from a standard application program, a setting that has been extracted from a plurality of settings to be displayed for the standard application program and whose setting value has been changed from a predetermined state.

BRIEF DESCRIPTION OF THE DRAWINGS

Exemplary embodiments of the present disclosure will be described in detail based on the following figures, wherein:

FIG. 5A is a diagram illustrating an example of a setting list in an initial state of a parent application according to the first exemplary embodiment, FIG. 5B is a diagram illustrating an example of a setting list in which all of settings of a parent application are displayed according to the first exemplary embodiment, and FIG. 5C is a diagram illustrating an example of a customization function setting screen of the parent application according to the present exemplary embodiment;

FIG. 9A is a diagram illustrating an example of a setting list of a parent application in a comparative example, and FIG. 9B is a diagram illustrating an example of a one-touch application check screen in the comparative example;

FIG. 13A is a diagram illustrating another example of the setting list of the parent application according to the first exemplary embodiment, and FIG. 13B is a diagram illustrating another example of the one-touch application check screen according to the first exemplary embodiment;

FIG. 15A is a diagram illustrating another example of the setting list of the parent application according to the first exemplary embodiment, and FIG. 15B is a diagram illustrating another example of the one-touch application check screen according to the first exemplary embodiment;

FIG. 17 is a diagram illustrating an example of switching of a screen in a method for generating an instruction for a one-touch application in a comparative example;

FIG. 19 is a diagram illustrating another example of the switching of a screen in the method for generating an instruction for a one-touch application according to the second exemplary embodiment;

DETAILED DESCRIPTION

Exemplary embodiments of the present disclosure will be described in detail hereinafter with reference to the drawings.

First Exemplary Embodiment

Figure 1:
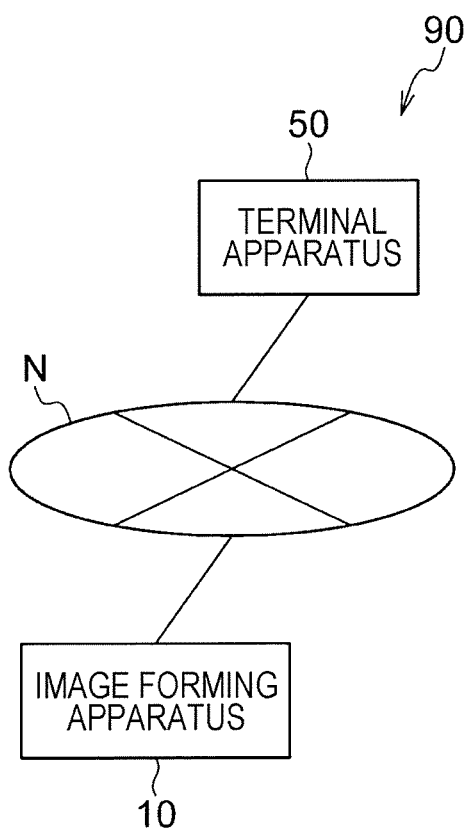
FIG. 1 is a diagram illustrating an example of the configuration of an image forming system according to a first exemplary embodiment.

FIG. 1 is a diagram illustrating an example of the configuration of an image forming system 90 according to a first exemplary embodiment.

As illustrated in FIG. 1, the image forming system 90 according to the present exemplary embodiment includes an image forming apparatus 10 and a terminal apparatus 50. The image forming apparatus 10 is an example of an information processing apparatus.

The terminal apparatus 50 is, for example, a personal computer (PC), a smartphone, a tablet terminal, or the like. The terminal apparatus 50 generates print data and transmits the print data to the image forming apparatus 10 through a network N. The image forming apparatus 10 receives the print data transmitted from the terminal apparatus 50 and forms an image according to the print data on a recording medium such as a sheet of paper. The network N is, for example, the Internet, a local area network (LAN), a wide-area network (WAN), or the like.

Figure 2:
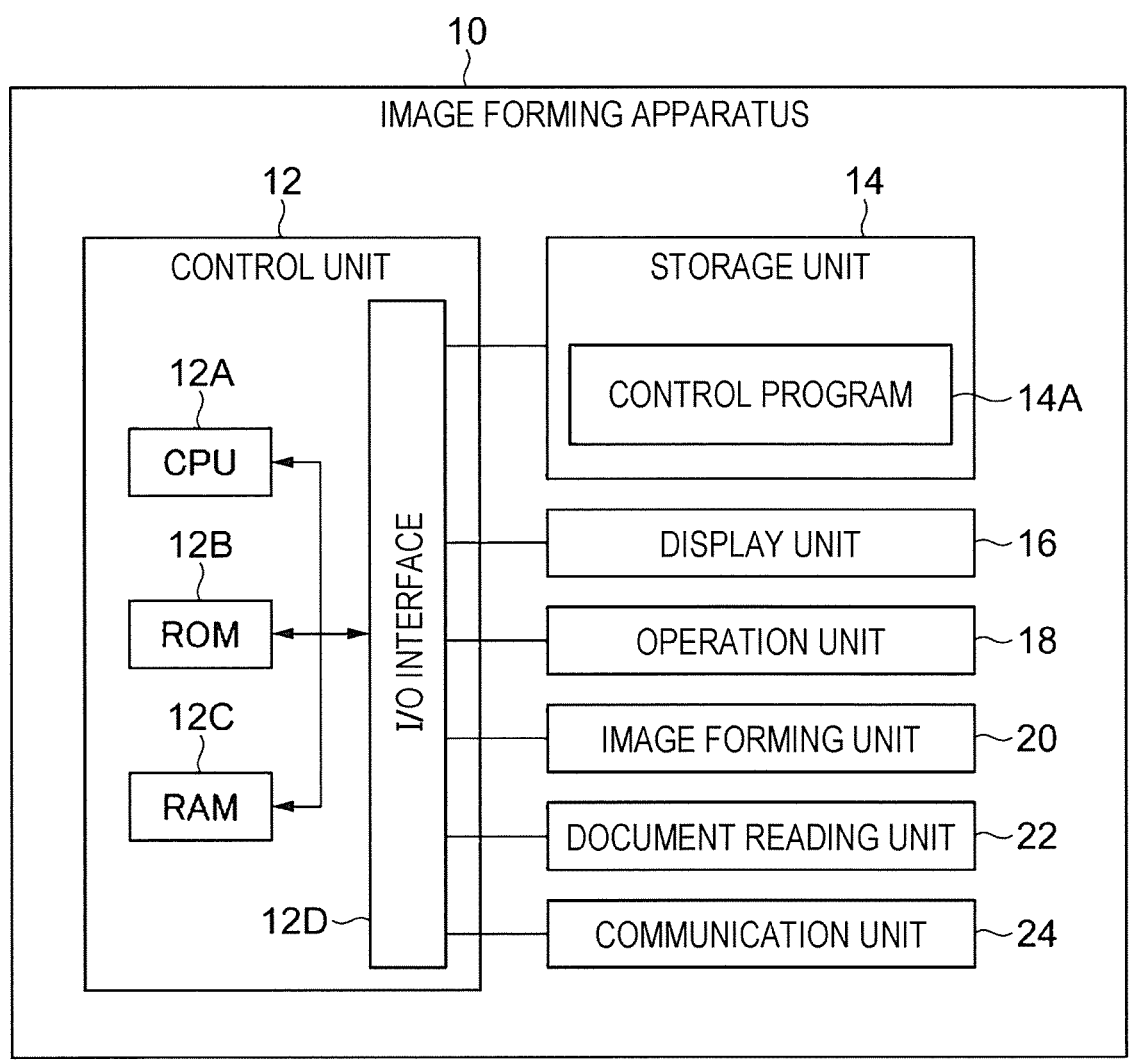
FIG. 2 is a block diagram illustrating an example of the electrical configuration of the image forming apparatus according to the first exemplary embodiment.

FIG. 2 is a block diagram illustrating an example of the electrical configuration of the image forming apparatus 10 according to the first exemplary embodiment.

As illustrated in FIG. 2, the image forming apparatus 10 according to the present exemplary embodiment includes a control unit 12, a storage unit 14, a display unit 16, an operation unit 18, an image forming unit 20, a document reading unit 22, and a communication unit 24.

The control unit 12 includes a central processing unit (CPU) 12A, a read-only memory (ROM) 12B, a random-access memory (RAM) 12C, and an input/output (I/O) interface 12D. These components are connected to one another through a bus.

The I/O interface 12D is connected to the functional units including the storage unit 14, the display unit 16, the operation unit 18, the image forming unit 20, the document reading unit 22, and the communication unit 24. These functional units are communicably connected to the CPU 12A through the I/O interface 12D.

The control unit 12 may control a part or the entirety of the operation of the image forming apparatus 10. An integrated circuit (IC) such as a large-scale integration (LSI) chip or an IC chipset is used for some or all of blocks of the control unit 12. Discrete circuits may be for the blocks, or a circuit in which some or all of the blocks are integrated together may be used. The blocks may be integrated together, or some blocks may be separately provided. In each of the blocks, a part of the block may be separately provided. A dedicated circuit or a general-purpose processor may be used to integrate the control unit 12 instead of an LSI chip.

The storage unit 14 may be, for example, a hard disk drive (HDD), a solid-state drive (SSD), or a flash memory. The storage unit 14 stores a control program 14A for controlling generation and execution of a related application program according to the present exemplary embodiment. The control program 14A may be stored in the ROM 12B, instead.

The control program 14A may be installed on the image forming apparatus 10 in advance. The control program 14A may be installed on the image forming apparatus 10 in a nonvolatile storage medium or through the network N. The nonvolatile storage medium may be, for example, a compact disc read-only memory (CD-ROM), a magneto-optical (MO) disk, an HDD, a digital versatile disc read-only memory (DVD-ROM), a flash memory, or a memory card.

The display unit 16 is, for example, a liquid crystal display (LCD) or an organic electroluminescent (EL) display. The display unit 16 includes a touch panel. The operation unit 18 is provided with various operation keys such as numeric keys and a start key. The display unit 16 and the operation unit 18 receive various instructions from a user of the image forming apparatus 10. The various instructions include, for example, an instruction to start reading a document and an instruction to start copying a document. The display unit 16 displays various pieces of information such as a result of a process performed in accordance with an instruction received from the user and a notification about a process.

The document reading unit 22 feeds a document set on a tray of an automatic document feeder, which is provided on the image forming apparatus 10 but is not illustrated, sheet by sheet and obtains image information by optically reading the document. Alternatively, the document reading unit 22 obtains image information by optically reading a document set on a stage such as a platen glass.

The image forming unit 20 forms, on a recording medium such as a sheet of paper, an image based on image information obtained through reading performed by the document reading unit 22 or image information obtained from an external personal computer (PC) connected through the network N. Although electrophotography is used to form an image in the present exemplary embodiment, another method such as an inkjet method may be used, instead.

When electrophotography is employed as the method for forming an image, the image forming unit 20 includes a photosensitive drum, a charging unit, an exposure unit, a developing unit, a transfer unit, and a fixing unit. The charging unit charges a surface of the photosensitive drum by applying voltage to the photosensitive drum. The exposure unit exposes the photosensitive drum charged by the charging unit to light according to image information to form an electrostatic latent image. The developing unit forms a toner image on the photosensitive drum by developing the electrostatic latent image formed on the photosensitive drum using toner. The transfer unit transfers the toner image formed on the photosensitive drum onto a recording medium. The fixing unit fixes the toner image transferred onto the recording medium through heating and pressurization.

The communication unit 24 is connected to the network N such as the Internet, a LAN, or a WAN and communicates with external PCs and the like through the network N.

As described above, all of a plurality of settings of a standard application program might be undesirably displayed in a screen area in which a plurality of settings of a related application program are displayed. In this case, it might not be easy for the user who views the screen area for the related application program to notice a change in the plurality of settings from the standard application program, and it might be difficult to understand a feature of the related application program.

In the following description, an application program will be simply referred to as an "application", a standard application program will be referred to as a "parent application", and a related application program will be referred to as a "child application" for the sake of convenience. A child application is generated, for example, by customizing a parent application. In the present exemplary embodiment, a so-called "one-touch application program (hereinafter referred to as a "one-touch application")" will be used as an example of the child application. A one-touch application is used to perform a predetermined process such as copying, scanning, or fax with predetermined settings and generated from a parent application.

Figure 3:
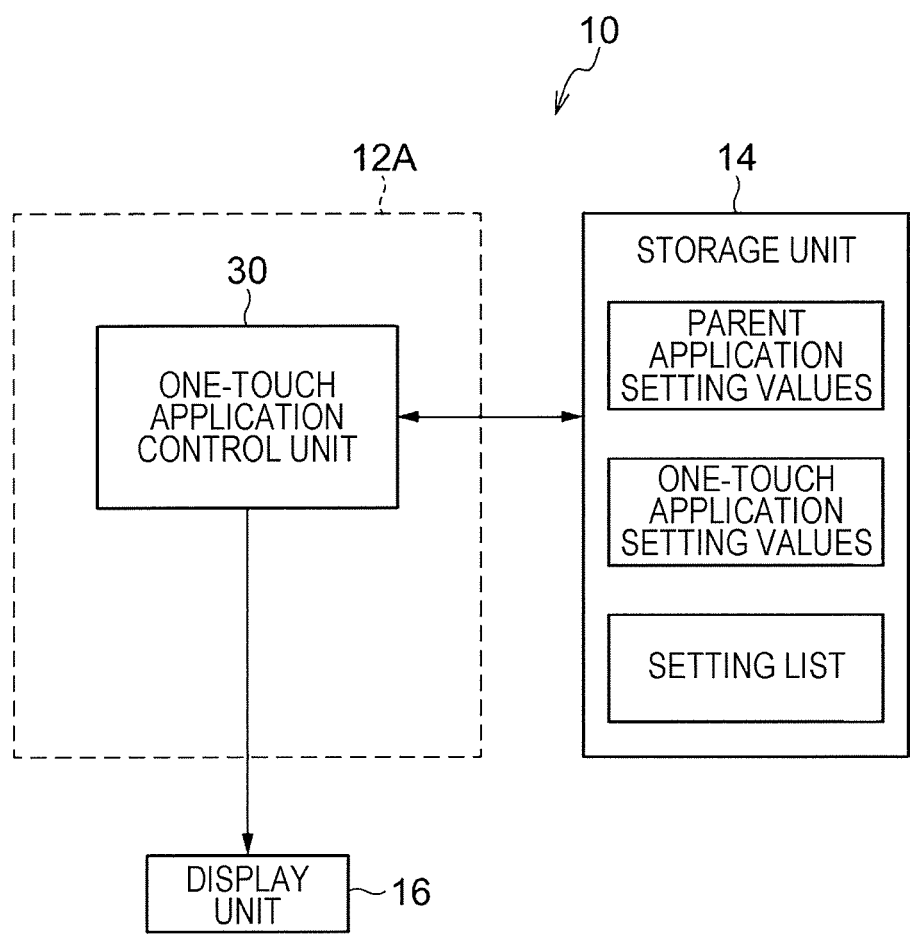
FIG. 3 is a block diagram illustrating an example of the functional configuration of the image forming apparatus according to the first exemplary embodiment.

The CPU 12A of the image forming apparatus 10 according to the present exemplary embodiment functions as a one-touch application control unit 30 illustrated in FIG. 3 by loading the control program 14A stored in the storage unit 14 into the RAM 12C and executing the control program 14A.

FIG. 3 is a block diagram illustrating an example of the functional configuration of the image forming apparatus 10 according to the first exemplary embodiment.

As illustrated in FIG. 3, the CPU 12A of the image forming apparatus 10 according to the present exemplary embodiment functions as the one-touch application control unit 30. The one-touch application control unit 30 is an example of a control unit.

The one-touch application control unit 30 according to the present exemplary embodiment displays, on the display unit 16 in a screen area for a one-touch application, a setting that has been extracted from a plurality of settings to be displayed for a parent application and whose setting value has been changed from a predetermined state while emphasizing the setting (hereinafter referred to as "emphasized display").

The predetermined state refers to, for example, an initial state at a time when the image forming apparatus 10 was installed at a predetermined place or an original state at a time when the image forming apparatus 10 was shipped from a factory. The predetermined place refers to an office, a factory, or the like to which the image forming apparatus 10 is delivered.

The storage unit 14 according to the present exemplary embodiment stores parent application setting values, one-touch application setting values, and a setting list, which is a list of settings of the one-touch application.

In the emphasized display performed by the one-touch application control unit 30, for example, the number of settings displayed in a screen area for the one-touch application is decreased from the number of settings displayed in a screen area for the parent application. In this case, the one-touch application control unit 30 displays, in the screen area for the one-touch application, a predetermined number of settings including a setting whose setting value has been changed from a predetermined state. The one-touch application control unit 30 displays N settings, for example, including a setting whose setting value has been changed. Alternatively, the one-touch application control unit 30 may display, in the screen area for the one-touch application, only a setting whose setting value has been changed from a predetermined state.

Alternatively, in the emphasized display performed by the one-touch application control unit 30, a setting whose setting value has been changed from a predetermined state may be displayed at a position more prioritized than positions of other settings. In this case, the one-touch application control unit 30 sequentially displays the setting whose setting value has been changed from the predetermined state and the other settings on the screen area for the one-touch application in predetermined order. For example, the one-touch application control unit 30 sequentially displays the settings downward in the screen area for the one-touch application. The more prioritized position refers to, when order of the settings is specified and any kind of priority (importance) is specified for the order, a position prioritized in the order. More specifically, when a screen scrolls vertically and applications are arranged vertically, that is, when upper applications are displayed first on the screen, the setting whose setting value has been changed is displayed as a top setting. The same holds for other ways of specifying priority (importance), such as a case where applications are arranged from left to right and a case where applications are arranged zigzag (in a shape of Z).

The one-touch application control unit 30 performs the emphasized display when a one-touch application is generated from a parent application or when a one-touch application is executed.

The one-touch application control unit 30 need not display, in a screen area for a one-touch application, a setting that has been removed from the screen area for a parent application.

Next, examples of a home screen and a screen area for a parent application will be described with reference to FIGS. 4 to 5C.

Figure 4:
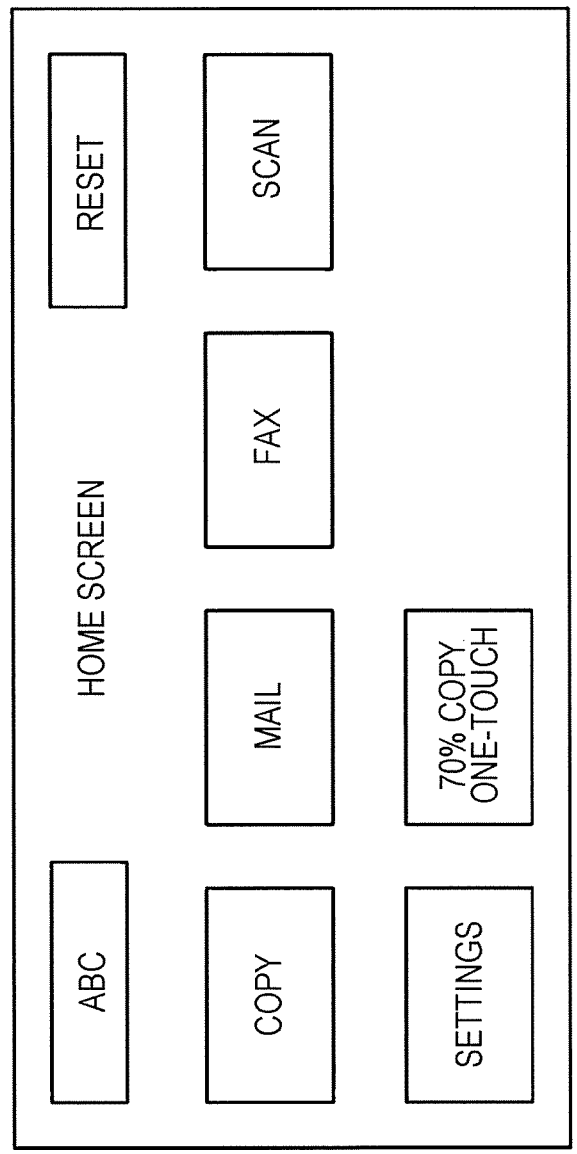
FIG. 4 is a diagram illustrating an example of a home screen according to the first exemplary embodiment.

FIG. 4 is a diagram illustrating an example of the home screen according to the present exemplary embodiment.

The home screen illustrated in FIG. 4 is displayed on the display unit 16 in a way that allows touch operations, and includes a plurality of icons for selecting execution of a plurality of functions. In the present exemplary embodiment, icons of "copy", "mail", "fax", "scan", "settings", and "70% copy one-touch" are displayed.

"Copy", "mail", "fax", and "scan" are an example of parent applications. "70% copy one-touch" is generated from a parent application (a copy application program here) and is an example of a one-touch application for copying with reduction to 70% in size.

As illustrated in FIG. 4, the "copy" icon is an icon for executing a copy function. If the use touches the "copy" icon with his/her finger or the like, the copy application program (hereinafter referred to as a "copy application") is executed, and the user is enabled to use the copy function. Similarly, the "mail" icon is an icon for executing a mail function, the "fax" icon is an icon for executing a fax function, and the "scan" icon is an icon for executing a scan function.

Icons herein refer to operators, such as figures or symbols, displayed on operation screens to active certain applications or switch to certain screens.

FIG. 5A is a diagram illustrating an example of a setting list in an initial state of a parent application according to the present exemplary embodiment. FIG. 5B is a diagram illustrating an example of a setting list including all settings of the parent application according to the present exemplary embodiment. FIG. 5C is a diagram illustrating an example of a customization function setting screen of the parent application according to the present exemplary embodiment.

If the "copy" icon on the home screen illustrated in FIG. 4 is selected, the setting list illustrated in FIG. 5A is displayed. The setting list illustrated in FIG. 5A is a setting list of the copy application, which is an example of the parent application. In the setting list illustrated in FIG. 5A, not all settings of the copy application but only certain settings are selectively displayed. In the setting list illustrated in FIG. 5B, on the other hand, all the settings of the copy application are displayed. Whether to display all the settings of the copy application is switched by pressing a switching button (not illustrated). In the customization function setting screen illustrated in FIG. 5C, whether to display each setting can be determined. In the example illustrated in FIG. 5C, a setting "collate" is not displayed.

Next, the operation of the image forming apparatus 10 according to the first exemplary embodiment will be described with reference to FIGS. 6 and 7.

Figure 6:
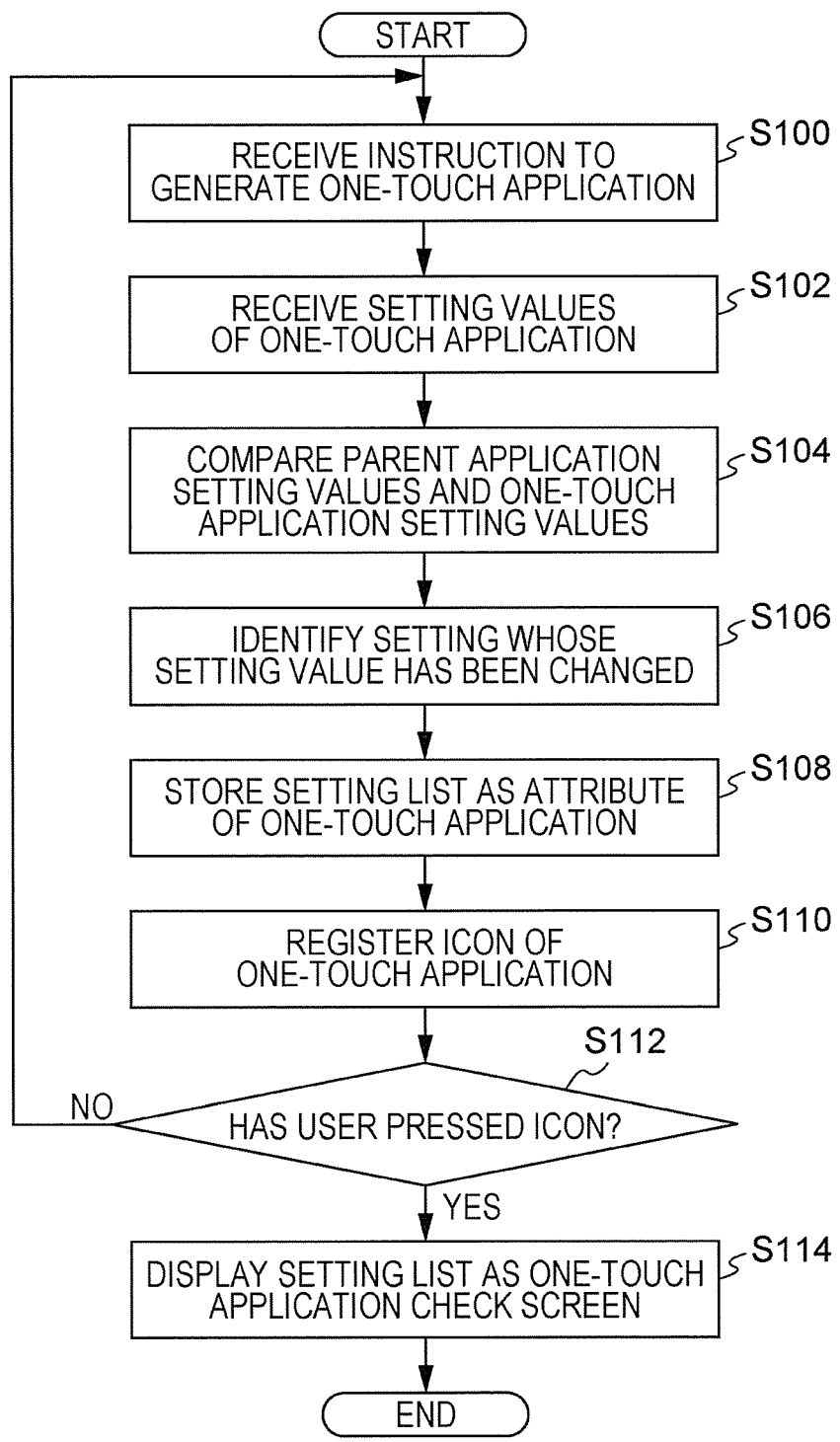
FIG. 6 is a flowchart illustrating an example of a process achieved by a control program when a one-touch application is generated according to the first exemplary embodiment.

FIG. 6 is a flowchart illustrating an example of a process achieved by the control program 14A when a one-touch application is generated according to the first exemplary embodiment.

First, the image forming apparatus 10 is activated. The home screen illustrated in FIG. 4 is displayed on the display unit 16, and the control program 14A is executed to perform the following steps.

In step S100 illustrated in FIG. 6, for example, the one-touch application control unit 30 receives an instruction to generate a one-touch application from a screen area for the parent application (the copy application in the present exemplary embodiment) illustrated in FIG. 5A.

In step S102, the one-touch application control unit 30 receives setting values of the one-touch application and stores the setting values in the storage unit 14 as one-touch application setting values. Setting values of the parent application are stored in the storage unit 14 in advance as parent application setting values.

In step S104, the one-touch application control unit 30 obtains the parent application setting values and the one-touch application setting values from the storage unit 14 and compares the parent application setting values and the one-touch application setting values with each other.

In step S106, the one-touch application control unit 30 identifies a setting whose setting value has been changed.

In step S108, the one-touch application control unit 30 generates a setting list on which the setting identified in step S106 is emphasized and stores the setting list in the storage unit 14 as an attribute of the one-touch application.

In step S110, the one-touch application control unit 30 generates an icon of the one-touch application and registers the icon in the home screen illustrated in FIG. 4.

In step S112, the one-touch application control unit 30 determines whether the user has pressed the icon of the one-touch application registered in step S110. If the one-touch application control unit 30 determines that the user has pressed the icon of the one-touch application (YES in step S110), the process proceeds to step S114. If the one-touch application control unit 30 determines that the user has not pressed the icon of the one-touch application (NO in step S110), the process returns to step S100, and an instruction is waited for.

In step S114, the one-touch application control unit 30 displays the setting list stored in the storage unit 14 in step S108 as a one-touch application check screen. The process achieved by the control program 14A thus ends.

Figure 7:
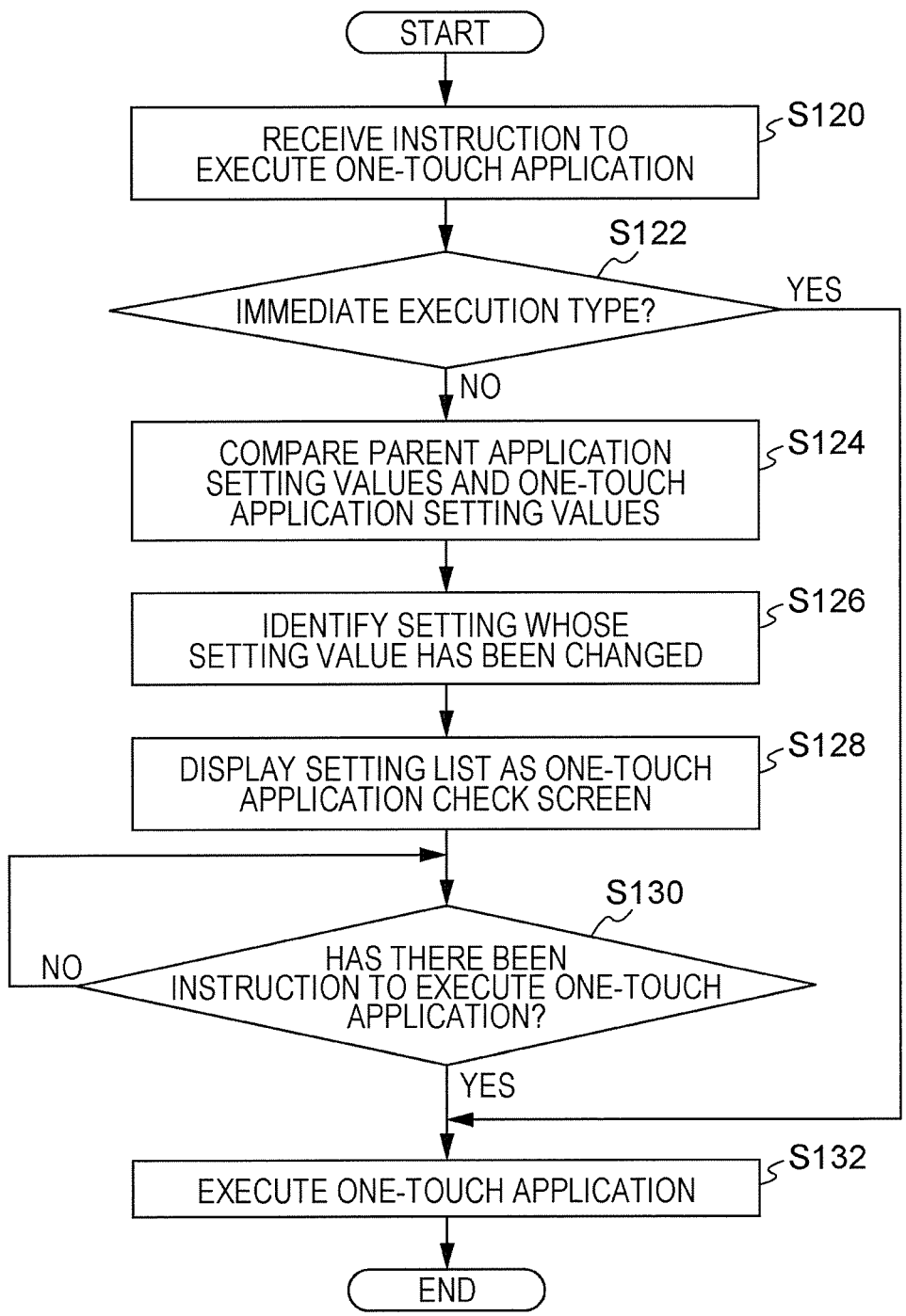
FIG. 7 is a flowchart illustrating an example of a process achieved by a control program when a one-touch application is executed according to the first exemplary embodiment.

FIG. 7 is a flowchart illustrating an example of a process achieved by the control program 14A when a one-touch application is executed according to the first exemplary embodiment.

First, the image forming apparatus 10 is activated. The home screen illustrated in FIG. 4 is displayed on the display unit 16, and the control program 14A is executed to perform the following steps. In the present exemplary embodiment, a case where an icon of the one-touch application has been registered in the home screen illustrated in FIG. 4 will be described.

In step S120 illustrated in FIG. 7, the one-touch application control unit 30 receives an instruction to execute the one-touch application.

In step S122, the one-touch application control unit 30 determines whether the one-touch application is of an immediate execution type. If the one-touch application control unit 30 determines that the one-touch application is of an immediate execution type (YES in step S122), the process proceeds to step S132. If the one-touch application control unit 30 determines that the one-touch application is not of an immediate execution type (NO in step S122), the process proceeds to step S124.

In step S124, the one-touch application control unit 30 obtains parent application setting values and one-touch application setting values from the storage unit 14 and compares the parent application setting values and the one-touch application setting value with each other.

In step S126, the one-touch application control unit 30 identifies a setting whose setting value has been changed.

In step S128, the one-touch application control unit 30 generates a setting list on which the setting identified in step S126 is emphasized and displays the setting list on the display unit 16 as a one-touch application check screen.

In step S130, the one-touch application control unit 30 determines, on the one-touch application check screen displayed in step S128, whether there has been an instruction to execute the one-touch application. If the one-touch application control unit 30 determines that there has been an instruction to execute the one-touch application (YES in step S130), the process proceeds to step S132. If the one-touch application control unit 30 determines that there has been no instruction to execute the one-touch application (NO in step S130), the process remains in step S130.

In step S132, the one-touch application control unit 30 executes the one-touch application. The process achieved by the control program 14A thus ends.

Next, a method for generating a one-touch application used by the image forming apparatus 10 according to the present exemplary embodiment will be described more specifically with reference to FIG. 8.

Figure 8:
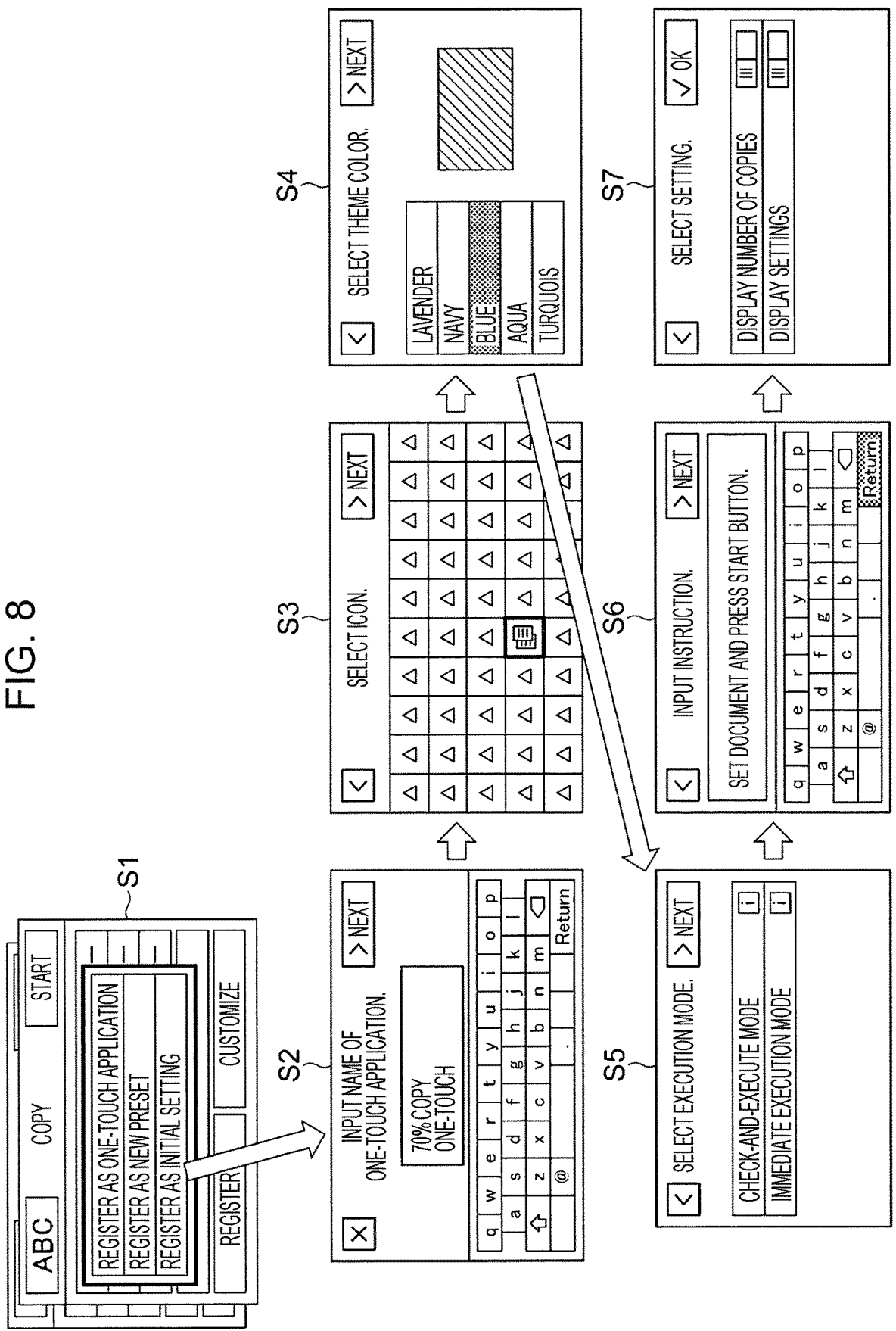
FIG. 8 is a diagram illustrating an example of switching of a screen in a method for generating a one-touch application according to the first exemplary embodiment.

FIG. 8 is a diagram illustrating an example of switching of a screen in the method for generating a one-touch application.

In (S1), the user operates a "register" button on the setting list illustrated in FIG. 5A or 5B, for example, to display a selection screen for selecting a purpose of registering a setting value as a popup window. Since the user is generating a one-touch application, the user selects "register as one-touch application" from displayed options.

In (S2), a name input screen for inputting a name of the one-touch application is displayed. Here, the user inputs a name "70% copy one-touch" as an example. The user then presses a "next" button.

In (S3), an icon selection screen for selecting an icon of the one-touch application is displayed. In the icon selection screen, the user can select a shape of an icon of the one-touch application to be generated. The user then presses a "next" button.

In (S4), a theme color selection screen for selecting a theme color of the icon of the one-touch application is displayed. In the theme color selection screen, the user can select a theme color of the icon of the one-touch application to be generated. The user then presses a "next" button.

In (S5), an execution mode selection screen for selecting an execution mode of the one-touch application is displayed. In the execution mode selection screen, two execution modes, namely a check-and-execute mode and an immediate execution mode. In the check-and-execute mode, if an icon of a one-touch application is selected, the one-touch application corresponding to the icon is not executed immediately. The one-touch application is executed if the user issues an instruction to execute the one-touch application after a check screen including a setting list is displayed to the user. In the immediate execution mode, on the other hand, if an icon of a one-touch application is selected, the one-touch application corresponding to the icon is immediately executed. In the execution mode selection screen, the check-and-execute mode is selected. The user then presses a "next" button.

In (S6), if the check-and-execute mode has been selected, an instruction input screen for inputting an instruction to be displayed on the check screen is displayed. Here, an instruction, "Set document and press start button", is displayed as an example of an initial state (default). The user may edit the instruction in the initial state as necessary.

Since the parent application of the one touch application to be generated is the copy application, a word "start button" is used in the initial state. If the parent application of the one-touch application to be generated is the mail application, however, a word "transmission button", for example, is used in the initial state. That is, in the initial state, a preset word is incorporated into a preset instruction in accordance with a type of parent application of the one-touch application to be generated. The user then presses a "next" button.

In (S7), a setting selection screen for selecting settings of the one-touch application is displayed. The setting selection screen includes two selection screens "display number of copies" and "display settings". If the user selects "display number of copies", a screen for inputting the number of copies to be printed set for the one-touch application is displayed. If the user selects "display settings", a screen for inputting setting values of the settings of the one-touch application is displayed. If the user presses an "OK" button, the one-touch application is generated, and the icon of the one-touch application is registered in the home screen illustrated in FIG. 4.

Next, an example in which a plurality of settings are displayed in a comparative example will be described with reference to FIGS. 9A and 9B.

FIG. 9A is a diagram illustrating an example of a setting list of a parent application in the comparative example.

FIG. 9B is a diagram illustrating an example of a one-touch application check screen in the comparative example.

"One-touch application copy", which is an example of the one-touch application, is generated by changing setting values of three settings "duplex", "paper feed tray", and "size" on the setting list of the copy application, which is an example of the parent application, illustrated in FIG. 9A. An icon 40 of "one-touch application copy" illustrated in FIG. 9B is then registered.

As illustrated in FIG. 9B, if the user presses the icon 40 of "one-touch application copy", a check screen including the setting list of "one-touch application copy" is displayed. Although the setting values of the settings "duplex", "paper feed tray", and "size" have been changed in this setting list, all the settings of the copy application, which is the parent application, are displayed, and it is difficult for the user to recognize at first glance the settings whose setting values have been changed.

Figure 10:
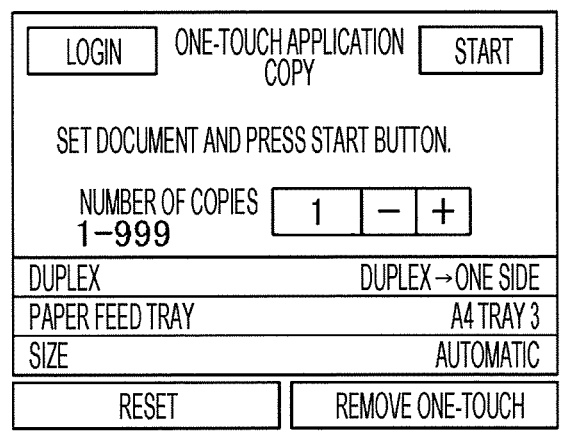
FIG. 10 is a diagram illustrating an example of a one-touch application check screen according to the first exemplary embodiment.

FIG. 10 is a diagram illustrating an example of the one-touch application check screen according to the present exemplary embodiment.

In a setting list on the one-touch application check screen illustrated in FIG. 10, for example, only the settings whose setting values have been changed are displayed. That is, since only the three settings "duplex", "paper feed tray", and "size", whose setting values have been changed, are displayed, the user recognizes the settings whose setting values have been changed at first glance.

As described above, for example, the number of settings of a one-touch application may be reduced from the number of settings of a parent application, or a predetermined number of settings including settings whose setting values have been changed may be displayed on a setting list of a one-touch application.

Figure 11:
FIG. 11 is a diagram illustrating another example of the one-touch application check screen according to the first exemplary embodiment.

FIG. 11 is a diagram illustrating another example of the one-touch application check screen according to the present exemplary embodiment.

In a setting list on the one-touch application check screen illustrated in FIG. 11, the settings whose setting values have been changed are displayed at prioritized positions. More specifically, the settings whose setting values have been changed are displayed at a top. That is, since the three settings "duplex", "paper feed tray", and "size", whose setting values have been changed, are sequentially displayed at the top, the user recognizes the settings whose setting values have been changed at first glance. In addition, by displaying the settings whose setting values have been changed at the top, the amount of scrolling that needs to be performed on the screen is reduced.

Figure 12:
FIG. 12 is a diagram illustrating another example of the one-touch application check screen according to the first exemplary embodiment.

FIG. 12 is a diagram illustrating another example of the one-touch application check screen according to the present exemplary embodiment.

As illustrated in FIG. 12, in a setting list of the one-touch application, the settings whose setting values have been changed may be displayed at prioritized positions, and settings displayed for the parent application may also be displayed. The settings displayed for the parent application are, for example, the settings illustrated in FIG. 5A. In addition, the settings that have been removed for the parent application need not be displayed for the one-touch application.

Various modes of the emphasized display performed by the one-touch application control unit 30 have been described. That is, in the emphasized display, the following modes are applied.

(1) The number of settings displayed in a screen area for a one-touch application is decreased from the number of settings displayed in a screen area for a parent application.
(2) Settings whose setting values have been changed are displayed at prioritized positions.
(3) Settings whose setting values have been changed are displayed in a different style so that the settings stand out.

In the case of (3), a font, a size, or a color used for the settings, for example, may be changed, or a change in typography, such as bold, italic, or underline, may be used.

The user may have changed initial setting values of a parent application, that is, original setting values at a time when the image forming apparatus 10 was shipped from the factory, after installing the image forming apparatus 10. In this case, as illustrated in FIGS. 13A and 13B, it might be desirable to compare the setting values of the settings of the one-touch application not with current setting values of the parent application but with original setting values at a time when the image forming apparatus 10 was shipped from the factory.

FIG. 13A is a diagram illustrating another example of the setting list of the parent application according to the present exemplary embodiment.

FIG. 13B is a diagram illustrating another example of the one-touch application check screen according to the present exemplary embodiment.

"One-touch application copy", which is an example of the one-touch application, is generated by changing four settings "output color", "duplex", "paper feed tray", and "size" on a setting list of the copy application, which is an example of the parent application, illustrated in FIG. 13A. A setting value of "output color", however, has been changed from "automatic", which is an original setting value, to "black-and-white". Setting values of "duplex", "paper feed tray", and "size" are the same as their respective original setting values. In this case, a setting value of "output color" is changed from "black-and-white" to "automatic" for the one-touch application, and the settings of "duplex", "paper feed tray", and "size" are also changed.

As illustrated in FIG. 13B, if the user presses the icon 40 of "one-touch application copy", a check screen including a setting list of "one-touch application copy" is displayed. Although the setting values of "duplex", "paper feed tray", and "size" have been changed from original setting values on the setting list, the setting value of "output color" has not been changed from "automatic", which is the original setting value. "Output color", therefore, is excluded from targets of the emphasized display. At this time, "output color" may be removed.

Figures 14A, 14B:
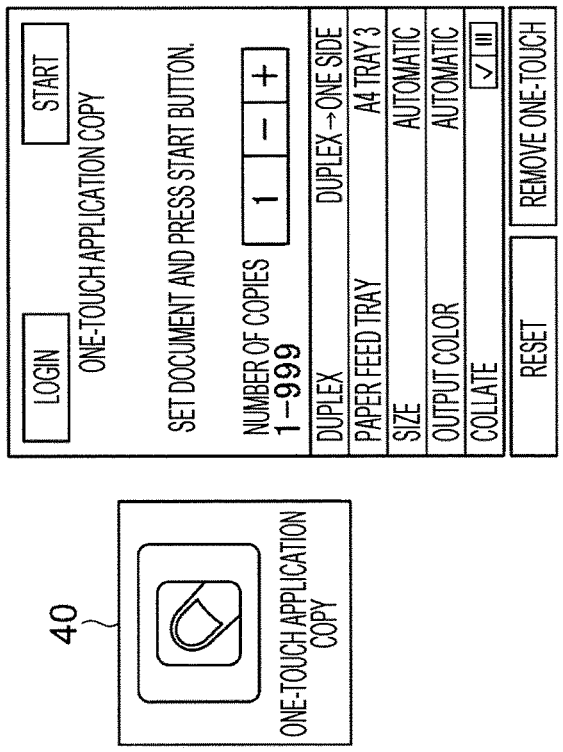
FIG. 14A is a diagram illustrating another example of the setting list of the parent application according to the first exemplary embodiment.
FIG. 14B is a diagram illustrating another example of the one-touch application check screen according to the first exemplary embodiment.

Next, as illustrated in FIGS. 14A and 14B, the user may select settings to be displayed for a one-touch application.

FIG. 14A is a diagram illustrating another example of the setting list of the parent application according to the present exemplary embodiment.

FIG. 14B is a diagram illustrating another example of the one-touch application check screen according to the present exemplary embodiment.

A setting list of the copy application, which is an example of the parent application, illustrated in a left part of FIG. 14A is displayed along with recycle bin icons if the user selects "display settings" (refer to FIG. 8). If the user selects the recycle bin icon of an unnecessary setting, the setting is removed.

A setting list illustrated in a right part of FIG. 14A is a setting list of the copy application obtained by excluding unnecessary settings from the setting list illustrated in the left part of FIG. 14A.

As illustrated in FIG. 14B, if the user presses the icon 40 of "one-touch application copy", a check screen including the setting list of "one-touch application" is displayed. In the setting list, settings removed by the user for the copy application are not displayed.

Next, as illustrated in FIGS. 15A and 15B, only settings whose setting values have been made temporarily changeable by the user for a one-touch application may be displayed.

FIG. 15A is a diagram illustrating another example of the setting list of the parent application according to the present exemplary embodiment.

FIG. 15B is a diagram illustrating another example of the one-touch application check screen according to the present exemplary embodiment.

A setting list of the copy application, which is an example of the parent application, illustrated in FIG. 15A is displayed along with "edit" icons if the user selects "display settings" (refer to FIG. 8). In this case, the user makes setting values of settings temporarily changeable by selecting "edit" icons of the settings. Here, setting values of two settings "size" and "output color" are made temporarily changeable.

As illustrated in FIG. 15B, if the user presses the icon 40 of "one-touch application copy", a check screen including the setting list of "one-touch application copy" is displayed. In the setting list, only the settings whose setting values have been made changeable by the user are displayed.

Second Exemplary Embodiment

In the first exemplary embodiment, a setting whose setting value has been changed is emphasized when a one-touch application is generated from a parent application. In a second exemplary embodiment, an instruction indicating an operation to be performed on a one-touch application is generated when the one-touch application is generated or executed.

First, the configuration of the image forming apparatus 10 according to the second exemplary embodiment will be described with reference to FIG. 3.

The one-touch application control unit 30 according to the present exemplary embodiment generates an instruction for a specification field displayed in a screen area for a one-touch application on the basis of a feature obtained from a setting whose setting value has been changed. An instruction is generated when a one-touch application is generated from a parent application or executed.

Next, the operation of the image forming apparatus 10 according to the second exemplary embodiment will be described with reference to FIG. 16.

Figure 16:
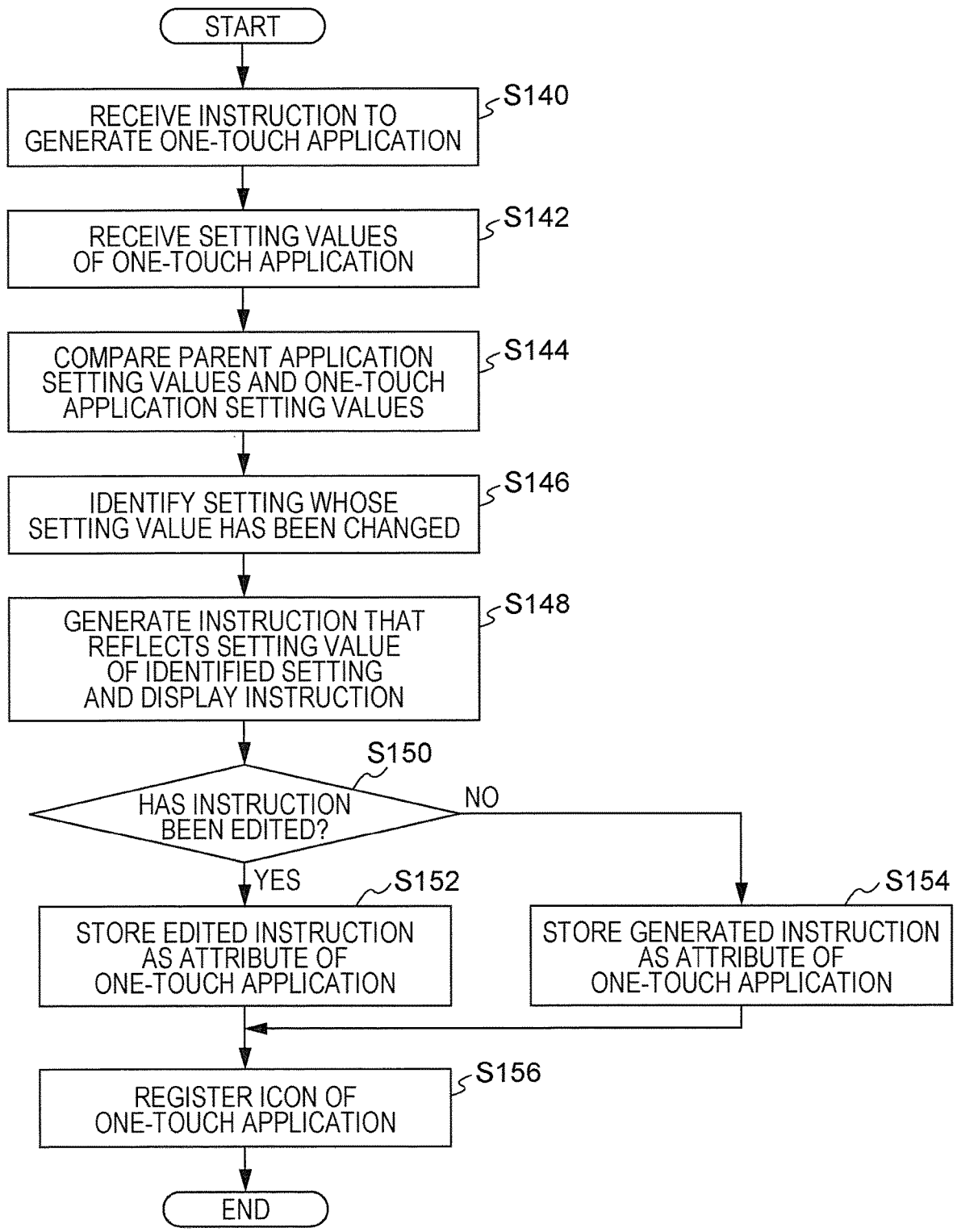
FIG. 16 is a flowchart illustrating an example of a process achieved by a control program when a one-touch application is generated according to a second exemplary embodiment.

FIG. 16 is a flowchart illustrating an example of a process achieved by the control program 14A when a one-touch application is generated according to the second exemplary embodiment.

First, the image forming apparatus 10 is activated. The home screen illustrated in FIG. 4 is displayed on the display unit 16, and the control program 14A is executed to perform the following steps.

In step S140 illustrated in FIG. 16, for example, the one-touch application control unit 30 receives an instruction to generate a one-touch application from a screen area for a parent application (the copy application in the present exemplary embodiment) illustrated in FIG. 5A.

In step S142, the one-touch application control unit 30 receives setting values of the one-touch application and stores the setting values in the storage unit 14 as one-touch application setting values. Setting values of the parent application are stored in the storage unit 14 in advance as parent application setting values.

In step S144, the one-touch application control unit 30 obtains the parent application setting values and the one-touch application setting values from the storage unit 14 and compares the parent application setting values and the one-touch application setting values with each other.

In step S146, the one-touch application control unit 30 identifies a setting whose setting value has been changed.

In step S148, the one-touch application control unit 30 generates an instruction that reflects the setting value of the setting identified in step S146 and displays the instruction on the display unit 16.

In step S150, the one-touch application control unit 30 determines whether the user has edited the instruction. If it is determined that the user has edited the instruction (YES in step S150), the process proceeds to step S152. If it is determined that the user has not edited the instruction (NO in step S150), the process proceeds to step S154.

In step S152, the one-touch application control unit 30 stores the edited instruction in the storage unit 14 as an attribute of the one-touch application, and the process proceeds to step S156.

In step S154, on the other hand, the one-touch application control unit 30 stores the generated instruction in the storage unit 14 as an attribute of the one-touch application, and the process proceeds to step S156.

In step S156, the one-touch application control unit 30 registers an icon of the one-touch application, and the process achieved by the control program 14A ends.

Next, a method for generating an instruction for a one-touch application in a comparative example will be described with reference to FIG. 17.

FIG. 17 is a diagram illustrating an example of switching of a screen in the method for generating an instruction for a one-touch application in the comparative example.

In (S11), an instruction input screen for inputting an instruction to be displayed on a one-touch application check screen is displayed as described with reference to FIG. 8. Here, an instruction, "Set document and press start button", is displayed as an example of an initial state (default).

In (S12), a setting selection screen for selecting a setting of the one-touch application is displayed. If the user presses an "OK" button, the one-touch application is generated, and an icon 40 of "one-touch application copy", which is an example of the one-touch application, is registered in the home screen illustrated in FIG. 4.

In (S13), the user presses the icon 40 of "one-touch application copy" to display a check screen including a setting list of "one-touch application copy". The check screen includes, above a number of copies field, a specification field where the instruction is displayed. The instruction input in (S11), "Set document and press start button", is displayed in the specification field.

This instruction, however, is just a standard description and does not sufficiently reflect a feature of the one-touch application. The user therefore needs to input an instruction that reflects the feature of the one-touch application.

Figure 18:
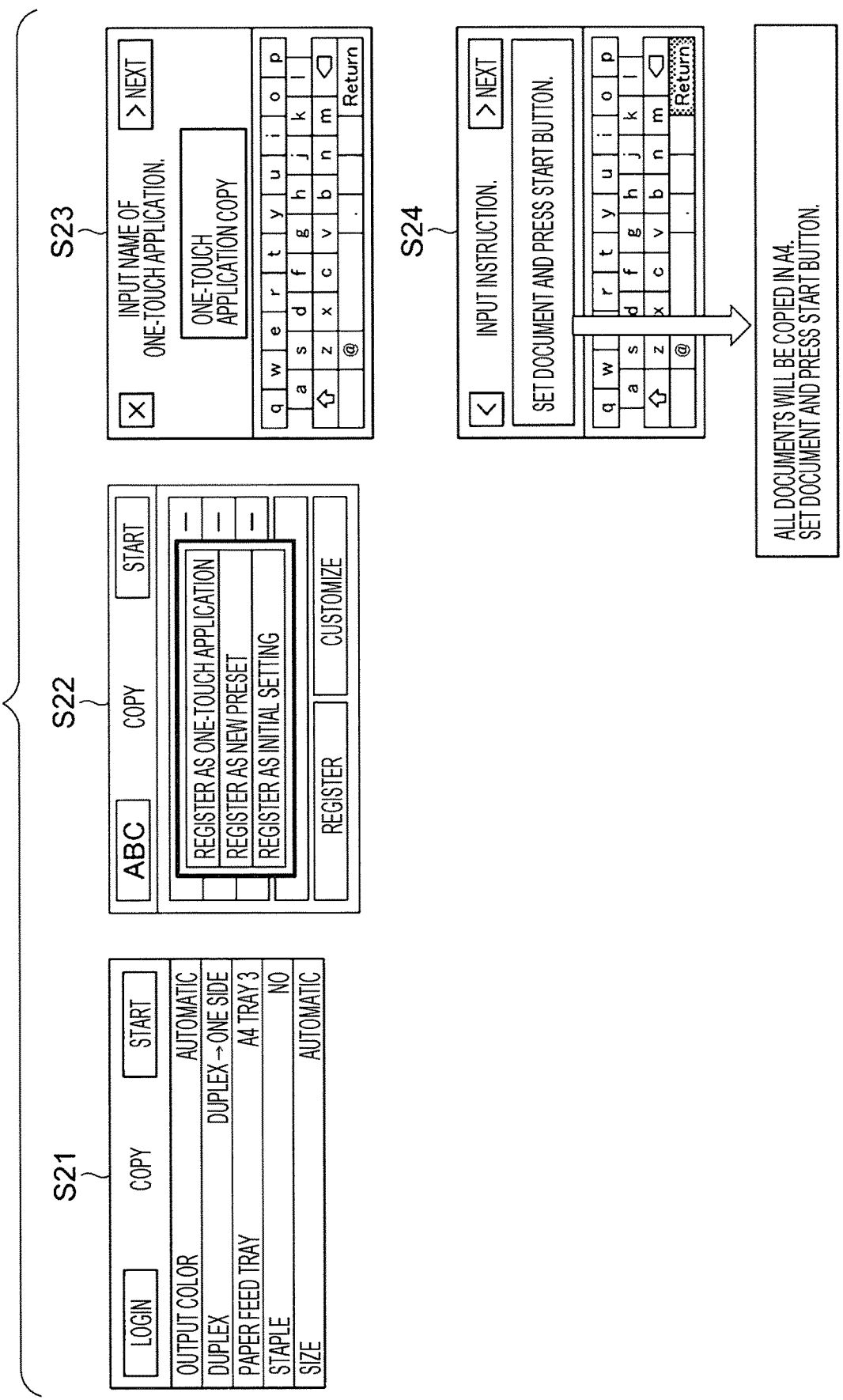
FIG. 18 is a diagram illustrating an example of switching of a screen in a method for generating an instruction for a one-touch application according to the second exemplary embodiment.

FIG. 18 is a diagram illustrating the example of the switching of a screen in the method for generating an instruction for a one-touch application according to the present exemplary embodiment. In this example, a case where a one-touch application is generated from a parent application will be described.

In (S21), a setting list of the copy application, which is an example of the parent application, is displayed. In the setting list, the setting values of the settings "duplex", "paper feed tray", and "size", for example, are changed.

In (S22), the user presses a "register" button, for example, to display a selection screen for selecting a purpose of registering a setting value as a popup window. Since the user is generating a one-touch application, the user selects "register as one-touch application" from displayed options.

In (S23), a name input screen for inputting a name of the one-touch application is displayed. Here, the user inputs a name "one-touch application copy" as an example. The user then presses a "next" button.

In (S24), an instruction input screen for inputting an instruction for the one-touch application is displayed. Here, as an example of an initial state (default), an instruction, "All documents will be copied in A4. Set document and press start button", which reflects the change in the setting value in (S21), is input instead of the instruction "Set document and press start button".

FIG. 19 is a diagram illustrating another example of the switching of a screen in the method for generating an instruction for a one-touch application according to the present exemplary embodiment. In this example, a one-touch application is newly generated.

In (S31), a home screen including a new application add button is displayed, and the user presses the new application add button.

In (S32), an application selection screen for selecting an application used to generate a one-touch application is displayed. In the application selection screen, "copy", "fax", "mail", or "scan" can be selected. The user selects one of the applications and presses a "next" button.

In (S33), an application setting screen for changing setting values of settings of the application selected on the application selection screen is displayed. After changing the setting values, the user presses a "next" button.

In (S34), a name input screen for inputting a name of the one-touch application is displayed. Here, the user inputs a name "70% copy one-touch" as an example. The user then presses a "next" button.

In (S35), an instruction input screen for inputting an instruction for the one-touch application is displayed. Here, as an example of an initial state (default), the instruction, "All documents will be copied in A4. Set document and press start button", which reflects the change made in (S33), is input instead of the instruction "Set document and press start button".

Next, a mode in which an instruction is generated when a one-touch application is executed will be described with reference to FIGS. 20A to 20C.

Figure 20A:
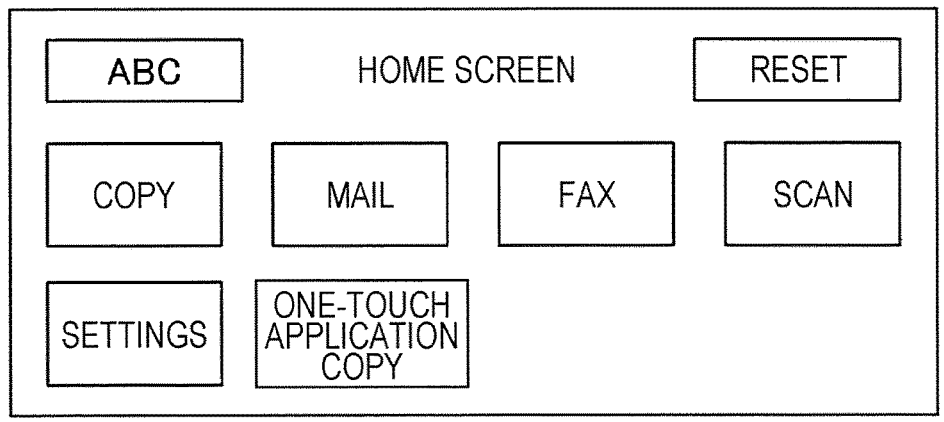
FIG. 20A is a diagram illustrating an example of a home screen according to the second exemplary embodiment.

FIG. 20A is a diagram illustrating an example of the home screen according to the present exemplary embodiment.

Figure 20B:
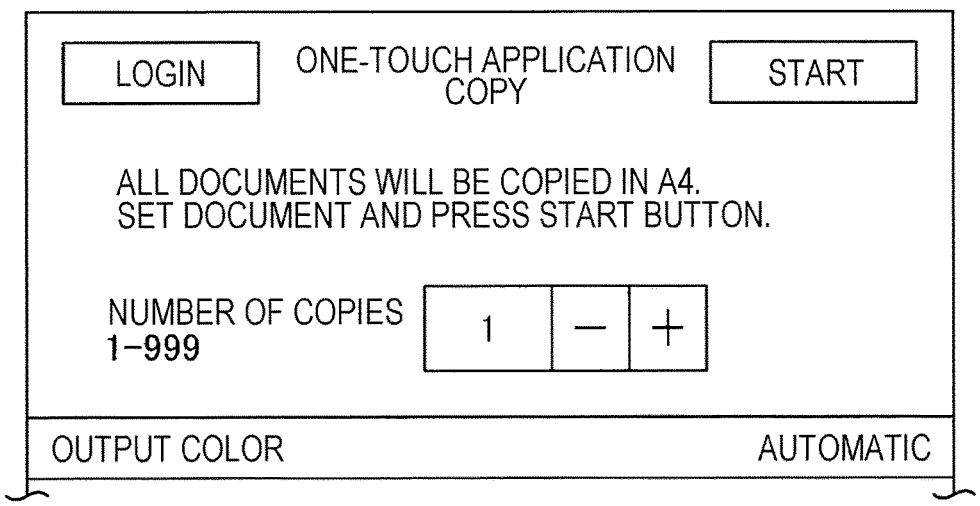
FIG. 20B is a diagram illustrating an example of a check screen at a time when an instruction has been generated when a one-touch application was generated.

FIG. 20B is a diagram illustrating an example of a check screen at a time when an instruction has been generated when a one-touch application was generated.

Figure 20C:
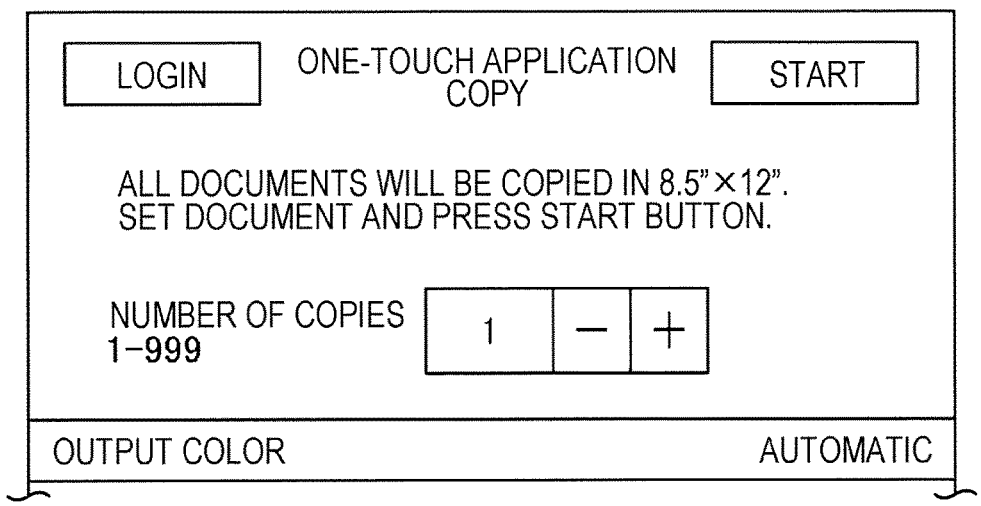
FIG. 20C is a diagram illustrating an example of a check screen at a time when the one-touch application was executed.

FIG. 20C is a diagram illustrating an example of a check screen at a time when an instruction has been generated when the one-touch application was executed.

An icon of "one-touch application copy", which is an example of the one-touch application, is displayed on the home screen illustrated in FIG. 20A.

A case is assumed where, for example, a paper feed tray stored A4 sheets at a time of generation of a one-touch application but the A4 sheets have been replaced by 8.5"×12" sheets before execution of the one-touch application. In this case, if an instruction is generated when the one-touch application is generated, the instruction illustrated in FIG. 20B, "All documents will be copied in A4. Set document and press start button", is undesirably displayed. If an instruction is generated when the one-touch application is executed, on the other hand, an instruction that reflects the change from A4 to 8.5"×12", that is, "All documents will be copied in 8.5"×12". Set document and press start button", is displayed as illustrated in FIG. 20C.

Next, a method for generating an instruction at a time when the mail application is used will be described.

Figure 21A:
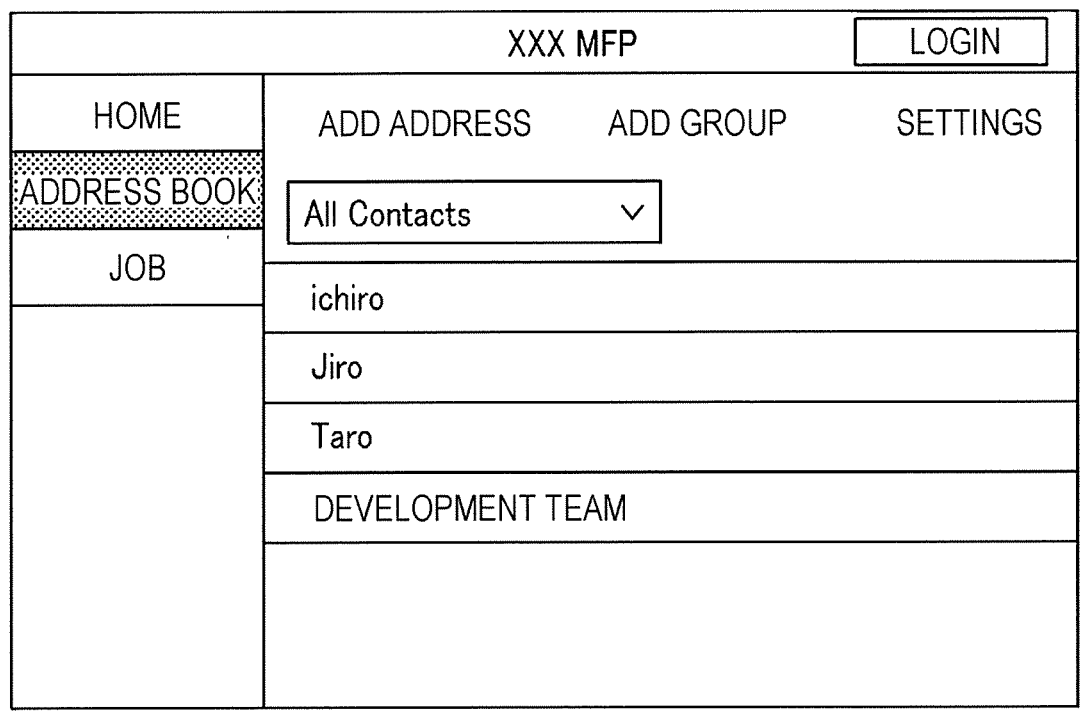
FIG. 21A is a diagram illustrating an example of an address book screen of a mail application according to the second exemplary embodiment.

FIG. 21A is a diagram illustrating an example of an address book screen of the mail application according to the present exemplary embodiment.

Figure 21B:
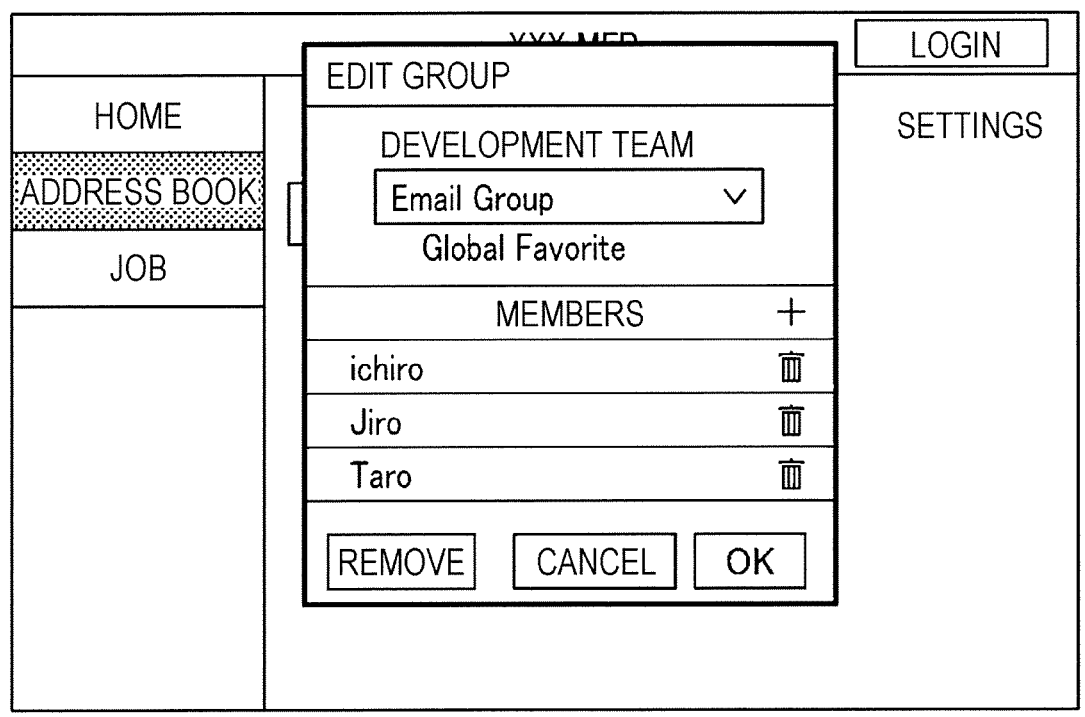
FIG. 21B is a diagram illustrating an example of an edit group screen of the mail application according to the second exemplary embodiment.

FIG. 21B is a diagram illustrating an example of an edit group screen of the mail application according to the present exemplary embodiment.

In the address book screen illustrated in FIG. 21A, a group name "development team" is registered. In the edit group screen illustrated in FIG. 21B, mail addresses of three members "ichiro", "Jiro", and "Taro" are registered.

Figure 22:
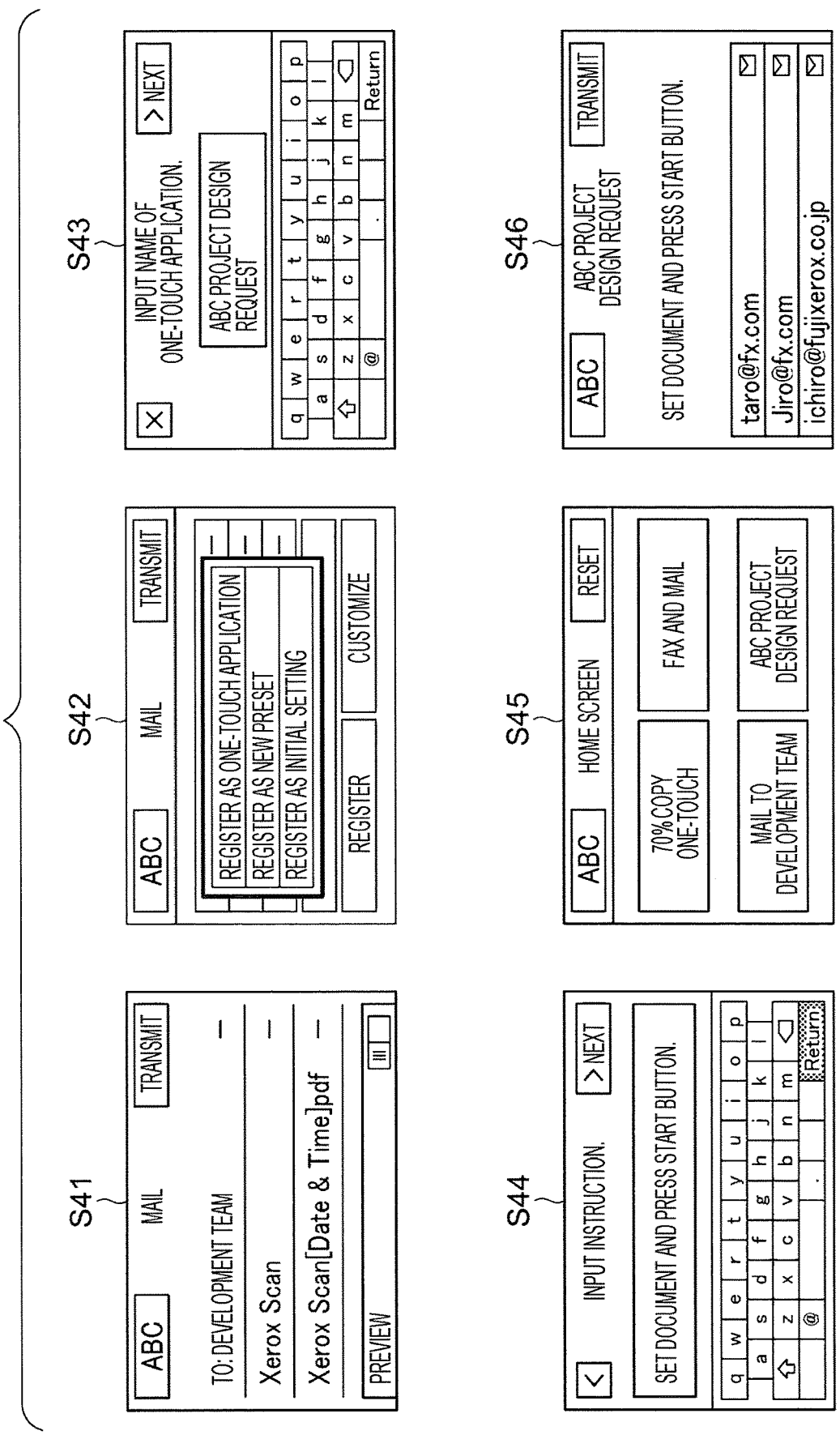
FIG. 22 is a diagram illustrating another example of the switching of a screen in the method for generating an instruction for a one-touch application in the comparative example.

FIG. 22 is a diagram illustrating another example of the switching of a screen in the method for generating an instruction for a one-touch application in the comparative example.

In (S41), a setting list of the mail application, which is an example of the parent application, is displayed. A group address "To: Development team", for example, is added to the setting list.

In (S42), the user operates a "register" button, for example, to display a selection screen for selecting a purpose of registering a setting value as a popup window. Since the user is generating a one-touch application, the user selects "register as one-touch application" from displayed options.

In (S43), a name input screen for inputting a name of the one-touch application is displayed. Here, the user inputs a name "ABC project design request" as an example. The user then presses a "next" button.

In (S44), an instruction input screen for inputting an instruction for the one-touch application is displayed. Here, an instruction, "Set document and press transmit button", is displayed as an example of an initial state (default).

In (S45), a home screen including an icon of "ABC projection design request", which is an example of the one-touch application, is displayed. The user then presses the icon of "ABC projection design request".

In (S46), a check screen including the addresses of "ABC projection design request" is displayed, but the instruction input in S44, "Set document and press transmit button", is still displayed.

This instruction is just a standard description and does not sufficiently reflect a feature of the one-touch application. The user therefore needs to input an instruction that reflects the feature of the one-touch application.

Figure 23:
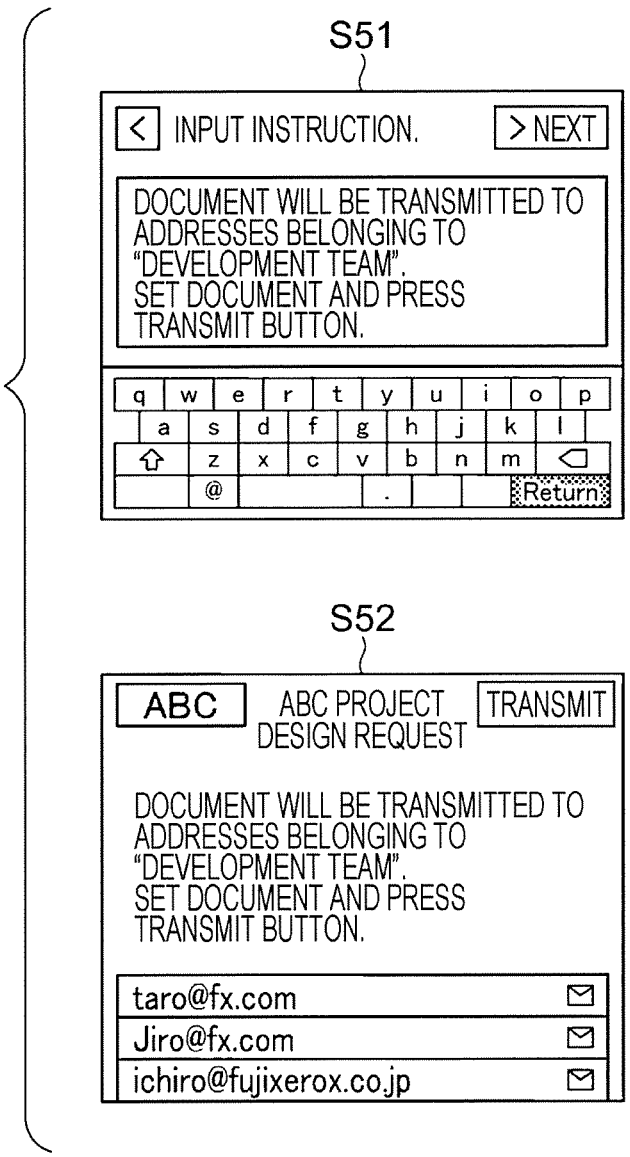
FIG. 23 is a diagram illustrating another example of the switching of a screen in the method for generating an instruction for a one-touch application according to the second exemplary embodiment.

FIG. 23 is a diagram illustrating another example of the switching of a screen in the method for generating an instruction for a one-touch application according to the present exemplary embodiment.

In (S51), an instruction input screen for inputting an instruction for the one-touch application is displayed. Here, as an example of an initial state (default), an instruction, "Document will be transmitted to addresses belonging to "Development team". Set document and press transmit button", which reflects the addition of "To: Development team" in (S41), is input instead of the instruction "Set document and press transmit button".

In (S52), the user presses the icon of "ABC project design request" to display a check screen including the addresses of "ABC project design request". In this case, the instruction input in (S51), "Document will be transmitted to addresses belonging to "Development team". Set document and press transmit button", is displayed.

In the case of the mail application, an instruction that lacks a group name is generated if an instruction is generated when a one-touch application is executed. It is therefore desirable to generate an instruction when a one-touch application is generated.

An image forming apparatus has been described as an example of the information processing apparatus according to each exemplary embodiment. Each exemplary embodiment may be achieved by a program for causing a computer to perform the functions of the components of the image forming apparatus, instead. Alternatively, each exemplary embodiment may be achieved by a computer readable medium storing the program.

The configuration of the image forming apparatus described in each exemplary embodiment is an example, and may be changed as necessary without deviating from the scope of the present disclosure.

The processes achieved by the programs described in the above exemplary embodiments are examples, and some steps may be omitted, new steps may be added, or the order of the steps may be changed, instead, without deviating from the scope of the present disclosure.

Although a case where the processes according to each exemplary embodiment are achieved by a software configuration using a computer by executing a program has been described in the exemplary embodiment, the processes need not be achieved by a software configuration. A hardware configuration or a combination of a hardware configuration and a software configuration may achieve the processes according to each exemplary embodiment, instead.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a touch screen;
a memory; and
a central processing unit that determines whether a related application program generated from a standard application program is an immediate execution type in response to a select on the related application program with a single press on the touch screen, wherein the immediate execution type executes the related application program without displaying a setting for the related application program in a screen area on which a plurality of settings of an application program are displayed, wherein the central processing unit emphasizes the setting for the related application program in the screen area in response to a determination indicating that the related application is a check-and-execution type which does not execute the related application program immediately until a user issues an instruction to execute the related application program after displaying a check screen including the setting for the related application program in the screen area in response to the select on the related application program, wherein the central processing unit executes the related application program without displaying the setting in the screen area in response to a determination indicating that the related application is the immediate execution type, wherein an additional input to specify a plurality of parameters for execution of the standard application program is required, a plurality of parameters for execution of the related application program are preconfigured so that the related application program is immediately executable with the single press on the touch screen, wherein the setting that has been extracted from a plurality of settings to be displayed for the standard application program and whose setting value has been changed from a predetermined state.

2. The information processing apparatus according to claim 1, wherein the central processing unit emphasizes the setting whose setting value has been changed from the predetermined state by decreasing a number of settings displayed in the screen area for the related application program from a number of settings displayed in a screen area for the standard application program.

3. The information processing apparatus according to claim 2, wherein the central processing unit displays, in the screen area for the related application program, a predetermined number of settings including the setting whose setting value has been changed from the predetermined state.

4. The information processing apparatus according to claim 2, wherein the central processing unit displays only the setting whose setting value has been changed from the predetermined state in the screen area for the related application program.

5. The information processing apparatus according to claim 3, wherein the central processing unit displays only the setting whose setting value has been changed from the predetermined state in the screen area for the related application program.

6. The information processing apparatus according to claim 1, wherein the central processing unit emphasizes the setting whose setting value has been changed from the predetermined state by displaying the setting whose setting value has been changed from the predetermined state at a position more prioritized than a position of another setting in the screen area for the related application program.

7. The information processing apparatus according to claim 6, wherein the central processing unit sequentially displays the setting whose setting value has been changed from the predetermined state and the other setting in a predetermined direction in the screen area for the related application program.

8. The information processing apparatus according to claim 1, wherein the central processing unit emphasizes the setting whose setting value has been changed from the predetermined state when the related application program is generated from the standard application program or when the related application program is executed.

9. The information processing apparatus according to claim 1, wherein the central processing unit does not display, in the screen area for the related application program, a setting that has been removed from a screen area for the standard application program.

10. The information processing apparatus according to claim 1, wherein the predetermined state is an initial state after the information processing apparatus is installed at a predetermined place or an original state at a time when the information processing apparatus is shipped from a factory.

11. The information processing apparatus according to claim 1, wherein the central processing unit generates an instruction for a specification field displayed in the screen area for the related application program on a basis of a feature obtained from the setting whose setting value has been changed from the predetermined state.

12. The information processing apparatus according to claim 11, wherein the central processing unit generates the instruction for the specification field displayed in the screen area for the related application program when the related application program is generated from the standard application program or when the related application program is executed.

13. A non-transitory computer readable medium storing a program causing a computer to function as the central processing unit included in the information processing apparatus according to claim 1.

14. An information processing apparatus comprising:
a memory; and
a central processing unit that generates an icon for a related application generated from a standard application program and registers the icon in a home screen area, wherein the central processing unit determines whether the related application program generated from the standard application program is an immediate execution type in response to a select on the icon with a single press on the icon, wherein the immediate execution type executes the related application program without displaying a setting for the related application program in a screen area on which a plurality of settings of an application program are displayed, wherein the central processing unit emphasizes the setting for the related application in the screen area in response to a determination indicating that the related application is a check-and-execution type which does not execute the related application program immediately until a user issues an instruction to execute the related application program after displaying a check screen including the setting for the related application program in the screen area in response to the select on the related application program, wherein the central processing unit executes the related application program without displaying the setting in the screen area in response to a determination indicating that the related application is the immediate execution type, wherein an additional input to specify a plurality of parameters for execution of the standard application program is required, a plurality of parameters for execution of the related application program are pre-configured so that the related application program is immediately executable with the single press on the icon, wherein the setting has been extracted from a plurality of settings to be displayed for the standard application program and whose setting value has been changed from a predetermined state.

* * * * *